Dec. 25, 1923.
1,478,690
R. L. ANDREAU
PROCESS OF PRODUCING TERPENIC ALCOHOLS
Filed June 20, 1919
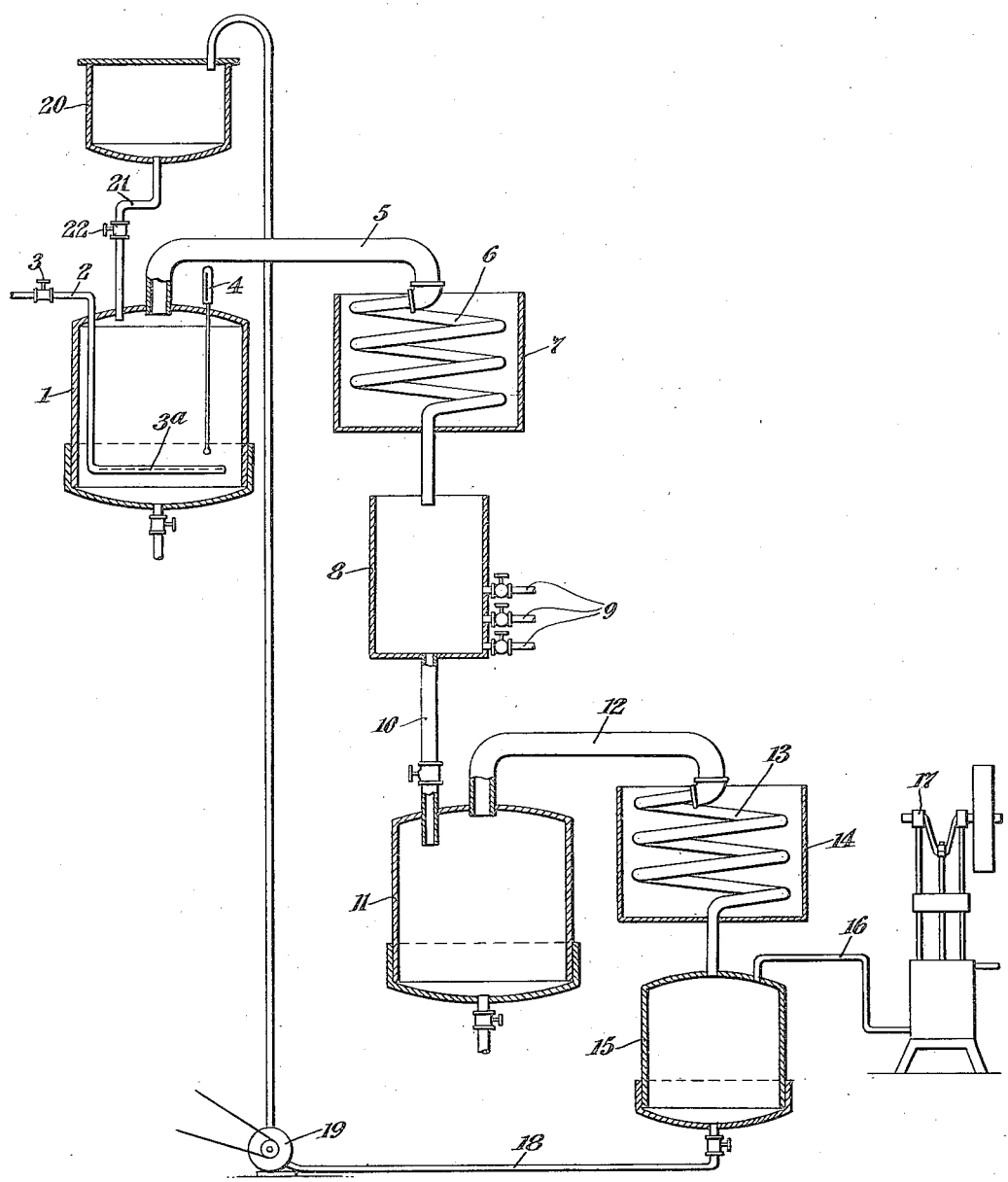
INVENTOR
R.L. Andreau,
BY
F.R. Squair.
ATTORNEY Patented Dec. 25, 1923.

1,478,690

UNITED STATES PATENT OFFICE.

ROLAND L. ANDREAU, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING TERPENIC ALCOHOLS.

Application filed June 20, 1919. Serial No. 305,609.

*To all whom it may concern:*

Be it known that I, ROLAND L. ANDREAU, a citizen of the United States, and a resident of Wawaset Park, Wilmington, in the county of New Castle and State of Delaware, have invented a certain new and useful Process of Producing Terpenic Alcohols, of which the following is a specification.

My invention relates to a process of producing terpenic alcohols from terpenes, and particularly to the production of camphols from mixtures of terpenes such as turpentine, which contain a large proportion of polycyclic terpenes. By the term "camphols" I means those alcohols or hydroxydihydrodicycloterpenes which may be considered as corresponding in structure to the ketone known as camphor, and which include borneol, isoborneol, and the isocamphols, including the cis and trans isomers, etc.

The principal object of my invention is to provide a process of the above described character whereby a much greater yield of camphols, such as isoborneol, may be obtained from turpentine than can be obtained when using the processes of the prior art.

Another object of my invention is to avoid the costly intermediate purification steps which have heretofore been considered necessary in the manufacture of camphols from turpentine, and to simplify the procedure as much as possible without lowering the yield of camphols.

Another object of my invention is to avoid certain mechanical difficulties inherent in those processes in which the foreign terpenes are almost entirely removed before the transformation of terpene to camphol is complete, since these foreign terpenes are useful to the extent that they serve to prevent the solidification of certain intermediate products which are likely, when solid, to cause serious trouble by clogging the pipes, condensers, and other necessary apparatus.

Another object of my invention is to recover substantially all of the isoborneol which may be formed theoretically from the quantity of terpene with which a particular operation starts, including the portion thereof tending to remain admixed with the foreign terpenes.

A further object of my invention is to provide a process in which the isoborneol may be readily separated from admixed terpenes, which are usually monocyclic terpenes or polymerized terpenes or their derivatives, notwithstanding the difficulty or impossibility of separating the isoborneol therefrom by the ordinary processes of distillation and crystallization, owing to the fact that these terpenes distill over with the isoborneol and when present, even in small quantities, prevent complete crystallization of the isoborneol, and owing to the fact, furthermore, that in the case of ordinary steam distillation, these terpenes distill over but leave behind a portion of the isoborneol mixed with rosin, oils, and heavy terpenes which are not driven over by the steam.

The general reactions by means of which camphols may be prepared are well known and are represented chiefly by two general methods. The first of these methods consists of saturating a terpene with hydrogen chloride in order to form a chloride, then heating this chloride with a metallic salt of an organic acid, in presence of an excess of this same organic acid, in order to decompose the terpenic chloride to give a metallic chloride and a camphol combined in the form of an ester with the acyl radical of the organic acid used in the process. This ester is then saponified to obtain the camphol. In the second method the terpenic chloride, prepared by saturating a terpene with hydrogen chloride as above, is heated with a metallic base in the presence of a body having weak acid or solvent properties, thus forming a metallic chloride and a terpene isomeric with the original terpene, but of different structure and properties. This terpene is then converted by heating with an organic acid into an ester of a camphol, and the ester saponified to give the desired camphol.

It has been the usual practice to prepare the terpene chloride in the pure state, preferably in crystalline form, before subjecting it to further treatment. More than one hundred patents have been taken in the United States and abroad in which the original material mentioned for preparing camphols, is the pure chloride. A few exceptions, in which terpene derivatives other than chlorides are made use of, may be cited as follows:

Thurlow (U. S. Patent 698,761) treats turpentine with oxalic acid, forming pinene oxalate, but at the same time there are formed numerous other substances which are of no value for the production of camphols, and which can be separated from the pinene oxalate only with great difficulty, if at all. Proposed methods for the separation of these various compounds are described in patents taken by the same inventor (U. S. Patents 726,783 and 833,095), covering processes for the separation of the pinene oxalate from the other esters and the unchanged terpenes by vacuum distillation before the borneol has been formed by the saponification of the oxalate.

Shukoff (French Patent 369,794) heats turpentine with acetic acid and sulphuric acid, then saponifies. This procedure gives hardly any camphol, as it is well known that sulphuric acid acting on turpentine has a destructive action, forming terebene and other substances with eliminaton of sulphur dioxide.

Hertkorn (U. S. Patent 901,293) heats turpentine with alcohol and boric anhydride, obtaining a boric ester of a camphol, which is fractionated and eventually saponified, the separation of other substances taking place before the saponification.

Zeitschel (U. S. Patent 907,941) follows a procedure similar to that described by Hertkorn with apparently similar results. His yield of borneol esters is only 40% and the impurities are removed by fractination before the esters are saponified.

A common feature of these and other processes described in the literature is that they all involve the removal of the undesirable compounds present in the initial raw material containing the terpene before the camphol itself is formed. Such a procedure is objectionable for several reasons, but mainly because it is impossible in this way to obtain a yield of pure camphol corresponding in a satisfactory degree to the quantity of terpene present in the original raw material. The great variety of substances formed during or involved in the various steps, consisting mainly of isomeric terpenes not transformable into the desired camphol, have boiling ranges within a few degrees of each other and from the desired product, and no method has been devised for separating them cleanly before the final formation of the camphol. Heavy polymerized terpenes, such as colophene, are also present, and when the mixtures are distilled these bodies are retained by the various fractions and hinder or prevent altogether the separation by ordinary means of the constituents of the mixture. As an example of the advantages to be gained by delaying the removal of the major part of the impurities until the camphol has been formed may be mentioned certain facts in connection with the preparation of the intermediate terpenic chloride, mentioned in the above description of the general methods. Numerous patents describe the saturation of a substance containing terpenes with hydrogen chloride and separation of the pure terpenic chloride in crystalline form. It is well known that the saturation of such substances with hydrogen chloride frequently gives rise to the formation of two isomeric chlorides which, when isolated, are solids, but which when mixed together have a tendency to form a liquid mixture. If one attempts, therefore, to separate solid crystals from such a mixture, a very large amount of the desired terpenic chloride will remain in the mother liquor, from which it is almost impossible to separate it. This amounts sometimes to as much as 50% of the total chlorides.

Another objection to the removal of the undesirable compounds before the camphol itself is formed is that unless these impurities are retained, certain of the intermediate products are produced in crystalline form, whereas if the impurities are allowed to remain they prevent crystallization and simplify the process, since liquids are more readily handled than solids in manufacturing operations, and semi-solid mixtures are likely to cause trouble by the clogging of pipes and condensers.

I have discovered that it is possible by a proper series of procedures to take a mixture of terpenes, such as turpentine, containing the valuable terpenic body which is to be transformed into a terpenic alcohol, together with a number of other compounds having variable boiling points and properties, to carry this entire mixture through the whole series of chemical transformations from the terpene to the terpenic alcohol, the major part of the impurities above mentioned remaining in the mixture until the transformation is complete, and then to separate the terpenic alcohol or camphol from the impurities by a method which is carried out in two stages. In the first stage there is distilled out of the mixture a ternary mixture of camphol, light terpenes, and water, this mixture having within certain temperature limits (98°–105° C.) such physical properties that certain terpenic bodies, otherwise non-volatile at that temperature, are carried over in the gaseous state. The heavy polymerized terpenes, rosinoils, etc., remain behind as a residue. In the second stage the distillate obtained by condensing the ternary mixture of camphol, light terpenes and water, is freed from water mechanically, and the mixture of camphol and light terpenes is then subjected to vacuum distillation, upon which the light terpenes distill out, leaving the camphol in pure form.

If it is found that the residue from the steam distillation comprising the first stage still contains camphol, the light terpenes separated in the vacuum distillation may be added to this residue, and the mixture again subjected to steam distillation, whereupon the camphol distills out mixed with water and the light terpenes, from which it is separated again as described. In this way the camphol may be separated from the impurities and completely recovered.

While my invention is capable of being carried out in many different ways and with different raw materials, I shall, for the purpose of illustration describe only one way of carrying out my invention hereafter, and while the separation of the camphol from impurities is capable of being carried out in connection with many different types of apparatus, I have shown only one form of apparatus for use in connection with my invention in the accompanying drawings, in which—

The figure is a diagrammatic representation of an apparatus in which my process may be carried out.

In the drawings, I have shown a still 1, having a steam pipe 2, provided with a hand valve 3, entering the top of the still and terminating near the bottom thereof, where said pipe is provided with a plurality of perforations 3ª. A thermometer 4 projects into the still. From the top of the still 1, a vapor outlet pipe 5 leads to a coil 6 of a condenser 7, which is arranged to discharge into a tank 8, having a plurality of draw-off cocks 9. Leading from the tank 8 there is a pipe 10, which conducts the iso-borneol from said tank into a vacuum still 11, provided with a vapor outlet pipe 12, leading to a coil 13 in a condenser 14, adapted to discharge into a tank 15, the upper portion of which is connected by a pipe 16 to a vacuum pump 17. A pipe 18 leads from the bottom of the tank 15, and, by means of a pump 19, is arranged to discharge into a supply tank 20, provided with a pipe 21, carrying a hand valve 22, and connected to the upper portion of the still 1.

In the operation of my invention a mixture of terpenes such as turpentine, which varies in composition but contains approximately 75% of pinene, 20% of dipentene or other isomers of pinene, and 5% of colophene, is saturated with hydrogen chloride, preferably in accordance with the process described in my copending application Ser. No. 151,171, filed February 27, 1917 until the desired chloride has been formed, the mass at the end of the operation being liquid or semi-liquid. The process as described in Ser. No. 151,171 comprises treating turpentine previously dried over calcium chloride, with 0.05% of its weight of acetic anhydride to remove all traces of water. About 270 parts by weight of hydrochloric acid gas, after being treated with an organic anhydride to remove traces of moisture, are caused to react with about 1000 parts of anhydrous spirits of turpentine produced as above described. As a result of this treatment pinene hydrochloride is formed quantitatively from the pinene present in the turpentine. This mass containing pinene hydrochloride is then treated as a whole, for example with an alkali-metal salt of a phenol, preferably by the method described in my copending application Ser. No. 179,127, filed July 7, 1917. According to application Ser. No. 179,127, I introduce 400 kg. of cresylic acid into a still with 40 kg. of a solution of caustic soda in 70 liters of water. The amount of cresylic acid is sufficient to combine with the caustic soda and leave a considerable excess of the cresylic acid. A high boiling solvent or diluent is thus provided. The contents of the still are then heated while stirring, until the temperature reaches 150°, and until practically no more water distills over. The amount of water left amounts to ½% of the mass, so that water is substantially absent therefrom. Thereupon I gradually introduce into the still 172.5 kg. of pinene hydrochloride which is preferably produced in accordance with the process set forth above. While the pinene hydrochloride is being introduced the mass is stirred. As a result the temperature drops to 130° C., but is thereafter raised to a temperature of from 135° to 142°, where it is maintained for four hours, after which time all the pinene hydrochloride will have been transformed into camphene. The camphene thus produced is distilled over with steam and is washed with an alkaline solution and dried with calcium chloride; this distillation and washing serves to remove non-terpenic impurities, such as phenol, sodium chloride, etc., and also a part of the relatively non-volatile terpenic substances, such as colophene.

Generally speaking, this method of producing camphene from a mixture containing pinene hydrochloride comprises heating the latter with an alkali-metal phenolate in the presence of a high boiling solvent or diluent, such as phenol, at atmospheric pressure and at a temperature below the boiling point of camphene, i. e. below 159° C. The reaction is carried out preferably at a temperature of about 142° C., the expression "about 142° C." including 135° C. The alkali-metal phenolate should be practically free from water. The resulting camphene-containing mixture obtained in this operation is then treated to convert the camphene into an acyl derivative of a camphol, for example by the following method:

100 kilograms of the camphene-containing mixture are heated with a mixture of 250 kilograms of glacial acetic acid, and 10 kilograms of 95% sulphuric acid, at a temperature of 50–60° C., for a few hours, with continuous or intermittent agitation. This treatment will result in the conversion of all the camphene in the mixture into acetyl isoborneol. The excess acetic acid may be recovered as desired by any one of several methods. Distillation will make possible the recovery of the acetic acid in glacial form, but there is some danger of loss of acetyl isoborneol because of the presence of sulphuric acid. The danger may be entirely avoided by drowning the reaction mixture in water, all of the constituents of the mixture being soluble with the exception of the acetyl isoborneol. The acetyl isoborneol may then be separated off and washed free from sulphuric and acetic acids with water. The water layer and the wash water may then be combined and treated in any suitable manner for the recovery of the acetic acid. Instead of using acetic acid, I may, if desired, use formic acid, propionic acid, etc. Instead of using the concentrated sulphuric acid it is also possible to use some other mineral acid such as phosphoric acid. The resulting ester is then saponified in the following manner:

In the ester prepared in the above manner is acetyl isoborneol, isoborneol may be obtained by saponifying the acetyl isoborneol by boiling with alcoholic caustic soda in the following proportions.

| | Parts. |
|---|---|
| Acetyl isoborneol | 196 |
| Ethyl alcohol | 500 |
| Caustic soda | 40 |

This mixture is boiled for 3 hours, the alcohol then distilled off, and the residue containing isoborneol is washed and centrifuged. In this manner the product is separated into two portions, one consisting of practically pure isoborneol in solid form, the other consisting of an oily filtrate containing from 30% to 60% of isoborneol together with a quantity of foreign terpenes. This latter portion is then treated as follows in the apparatus described above and shown in the accompanying drawings:

The oily mass is placed in the still 1 and subjected to a current of live steam admitted through the pipe 2, the temperature of the mass being maintained at approximately 98° to 105° C. The liquid which distills over is at first fluid and contains about 30% of isoborneol, but thereafter becomes thicker and carries some crystals of isoborneol, the accumulation of which threatens to clog the condenser, whereupon the distillation is stopped. The fraction which is thus distilled over is separated from the water by drawing off the upper layer through one of the draw-off cocks 9, and is conveyed into the vacuum still 11. A vacuum of preferably not less than 740 mm. of mercury is applied to said still by means of the vacuum pump 17, so that the absolute pressure in the still will be approximately 20 mm. of mercury or less, and heat is applied to said still. The distillation is continued until the liquid ceases to distill, and it will then be found that the still contains the isoborneol in solid form. The distillate of light terpenes, which under these conditions is practically free from isoborneol, is collected in the tank 15, and is pumped therefrom into the tank 20, where it is allowed to flow back into the still 1, which contains the heavy residual terpenes, as well as some isoborneol. The distillation in the still 1 is thus continued, and the light terpenes distilled away from the same carry off a further quantity of the isoborneol, which is recovered in the same manner as previously described, while further additional quantities of the light terpenes are allowed to flow into the still 1, until all the isoborneol has been removed therefrom. Stated in other words, this operation comprises distilling a mixture containing isoborneol and heavy terpenes while maintaining in the mixture a substantial proportion of light terpenes until practically all of the isoborneol has been distilled out of the mixture. The isoborneol thus collected in the still 11 is washed and centrifuged in order to purify it, while the light distillate contained in the tanks 15 and 20 is white in color and can be used as a solvent for varnishes, etc.

In the distillation with live steam of the mixture containing isoborneol and foreign terpenes, the temperature of distillation is preferably maintained at a point not above 105° C. My invention includes the combination of the several steps of distilling various above mentioned isoborneol mixtures without reference to particular temperatures which have been mentioned above in specific examples.

While I have described my invention above in detail, I wish it to be understood

I claim:

1. The process of producing a terpenic alcohol from impure terpene which comprises treating the impure terpene with a hydrogen halide to form a terpene hydrohalide, treating the resulting mixture with a reagent capable of splitting off hydrogen halide from the terpene hydrohalide to form an isomeric terpene, subjecting the mass to the action of reagents capable of converting said isomeric terpene into the corresponding acyloxy-dihydroterpene, hydrolyzing the latter in the presence of impurities to form an hydroxydihydroterpene, and then separating the hydroxydihydroterpene from its impurities.

2. The process of producing a terpenic alcohol from impure terpene which comprises treating the impure terpene with a hydrogen halide to form a terpene hydrohalide, treating the resulting mixture with an alkali-metal phenolate to form an isomeric terpene, subjecting the mass to the action of an organic acid in the presence of sulfuric acid to convert said isomeric terpene into the corresponding acyloxy-dihydroterpene, hydrolyzing the latter in the presence of impurities to form an hydroxydihydroterpene, and then separating the hydroxydihydroterpene from its impurities.

3. The process of producing a camphol from turpentine which comprises treating the turpentine with hydrogen chloride to form a polycyclic terpene hydrochloride, splitting off hydrogen and chlorine therefrom to form an isomeric terpene, combining the latter with an organic acid to form a camphol ester, saponifying said ester to form a camphol, all of the above mentioned steps being carried out without removal of more than a small percentage of substances, originally present in the turpentine, which are not transformable into a camphol by the above steps, and then separating the camphol from the substances mixed therewith.

4. The process of producing a camphol from turpentine which comprises treating the turpentine with hydrogen chloride to form a polycyclic terpene hydrochloride, splitting off hydrogen and chlorine therefrom to form an isomeric terpene, combining the latter with an organic acid to form a camphol ester, saponifying said ester to form a camphol; all of the above mentioned steps being carried out without removal of more than a small percentage of substances, originally present in the turpentine, which are not transformable into a camphol by the above steps, distilling the resulting mixture with a current of live steam to remove camphol and volatile impurities from relatively non-volatile impurities, and then separating the camphol from the other substances present in the resulting distillate.

5. The process of producing a camphol from turpentine which comprises treating the turpentine with hydrogen chloride to form a polycyclic terpene hydrochloride, splitting off hydrogen and chlorine therefrom to form an isomeric terpene, combining the latter with an organic acid to form a camphol ester, saponifying said ester to form a camphol; all of the above mentioned steps being carried out without removal of more than a small percentage of substances, originally present in the turpentine, which are not transformable into a camphol by the above steps, distilling the resulting mixture with a current of live steam to form a distillate consisting essentially of camphol, volatile impurities and water, separating the water, and then subjecting the residue to vacuum distillation to separate the volatile impurities from the camphol.

6. The process of producing isoborneol from turpentine which comprises treating the turpentine with a hydrogen halide to form a pinene hydrohalide, treating the resulting mixture with a reagent capable of splitting off hydrogen and halogen from the pinene hydrohalide to form camphene, removing at least a major part of the non-terpenic impurities, treating the remaining mixture containing camphene with an organic acid and a condensing agent to form a mixture containing an isoborneol ester, saponifying the ester in said mixture to form isoborneol mixed terpenic impurities, and then separating said terpenic impurities from the isoborneol.

7. The process of producing isoborneol from turpentine which comprises treating the turpentine with a hydrogen halide to form a pinene hydrohalide, treating the resulting mixture with a reagent capable of splitting off hydrogen and halogen from the pinene hydrohalide to form camphene, removing at least a major part of the non-terpenic impurities, treating the remaining mixture containing camphene with an organic acid and a condensing agent to form a mixture containing an isoborneol ester, saponifying the ester in said mixture to form isoborneol mixed with terpenic impurities, distilling the resulting mixture with a current of live steam to form a distillate consisting essentially of isoborneol, volatile terpenic impurities, and water, separating the water, and then subjecting the residue to vacuum distillation to separate the volatile terpenic impurities from the isoborneol.

8. The process of producing isoborneol from turpentine which comprises treating the turpentine with hydrogen chloride to form pinene hydrochloride, treating the resulting mixture with an alkali-metal phenolate to convert the pinene hydrochloride into camphene, removing alkali-metal chloride and the phenol which results from the preceding step, treating the remaining mixture containing camphene with acetic acid and a condensing agent to convert the camphene into isobornyl acetate, eliminating the condensing agent and any excess of acetic acid, treating the resulting isobornyl acetate mixture with a saponifying agent to convert the isobornyl acetate into isoborneol and a metal acetate, separating any isoborneol which may be present in solid condition, distilling the residual liquid with live steam to form distillate consisting essentially of isoborneol, volatile trepenic impurities, and water, separating the water, and then separating the volatile terpenic impurities from the isoborneol by distillation under a pressure substantially below atmospheric pressure.

9. The process of producing isoborneol which comprises treating a mixture comprising camphene associated with terpenic impurities with an organic acid and a condensing agent to form a mixture containing an isoborneol ester, saponifying the ester in said mixture to form isoborneol mixed with terpenic impurities, and then separating said terpenic impurities from the isoborneol.

10. The process of producing isoborneol which comprises treating a mixture comprising camphene associated with terpenic impurities with an organic acid and a condensing agent to form a mixture containing an isoborneol ester, saponifying the ester in said mixture to form isoborneol mixed with terpenic impurities, distilling the resulting mixture with a current of live steam to form a distillate consisting essentially of isoborneol, volatile terpenic impurities, and water, separating the water, and then subjecting the residue to vacuum distillation to separate the volatile terpenic impurities from the isoborneol.

11. The process of producing an hydroxydihydrodicycloterpene from a mixture containing monocyclic and dicyclic terpenes which comprises causing the dicyclic terpene in said mixture to combine with an organic acid to form an acyloxy-dihydrodicycloterpene, removing at least a substantial part of any non-terpenic substances which may be present, subjecting the remaining mixture to the action of a saponifying agent to form an hydroxydihydrodicycloterpene mixed with monocyclic terpenic substances, and separating the latter from the hydroxydihydrodicycloterpene.

12. The process of separating isoborneol from a mixture containing isoborneol and heavy terpenes which comprises distilling said mixture with a current of steam while maintaining in the mixture a substantial proportion of light terpenes until practically all of the isoborneol has been distilled out of the mixture.

13. The process of separating isoborneol from a mixture containing isoborneol and heavy terpenes which comprises distilling said mixture with a current of steam at a temperature of from about 98° to 105° C. while maintaining in the mixture a substantial proportion of light terpenes until practically all of the isoborneol has been distilled out of the mixture.

14. The process of separating isoborneol from a mixture containing isoborneol and heavy terpenes which comprises distilling said mixture with a current of steam while maintaining in the mixture a substantial proportion of light terpenes until practically all of the isoborneol has been distilled out of the mixture, separating the isoborneol and the light terpenes in the distillate from the water contained therein, and subjecting the mixture of isoborneol and light terpenes to distillation under reduced pressure to separate the light terpenes from the isoborneol.

15. The process of separating isoborneol from a mixture containing isoborneol and heavy terpenes which comprises distilling said mixture with a current of steam at a temperature of from about 98 to 105° C. while maintaining in the mixture a substantial proportion of light terpenes until practically all of the isoborneol has been distilled out of the mixture, separating the isoborneol and the light terpenes in the distillate from the water contained therein, and subjecting the mixture of isoborneol and light terpenes to distillation under reduced pressure to separate the light terpenes from the isoborneol.

16. In the process of separating isoborneol from terpenes the step which comprises distilling a mixture of isoborneol and light terpenes under an absolute pressure not exceeding about 20 mm. of mercury to remove the light terpenes from the isoborneol.

17. The process of separating isoborneol from admixed foreign terpenes which comprises subjecting the mixture to distillation with a current of steam, then subjecting the distillate to vacuum distillation, and then distilling the residue of said mixture with a quantity of light terpenes added thereto which have been obtained as a distillate in the vacuum distillation.

18. The process of separating isoborneol from admixed foreign terpenes which comprises subjecting the mixture to distillation with a current of steam at a temperature not above 105° C. then subjecting the distillate to vacuum distillation, and then distilling the residue of said mixture with a quantity of light terpenes added thereto which have been obtained as a distillate in the vacuum distillation.

19. The process of separating isoborneol from a mixture containing isoborneol and light and heavy terpenes which comprises subjecting said mixture to distillation with steam at a temperature not above about 105° C. to distill out a ternary mixture of isoborneol, light terpenes and water vapor, separating the water in the resulting distillate from the isoborneol and light terpenes, subjecting the mixture of the isoborneol and light terpenes to distillation under reduced pressure to distill off the light terpenes, and returning the latter to the first mentioned mixture containing heavy terpenes until all the isoborneol has been distilled out.

In testimony whereof I affix my signature
ROLAND L. ANDREAU.